US006243252B1

(12) United States Patent
Kuroiwa et al.

(10) Patent No.: US 6,243,252 B1
(45) Date of Patent: Jun. 5, 2001

(54) LAMINATED CERAMIC ELECTRONIC COMPONENT

(75) Inventors: Shinichiro Kuroiwa; Yasunobu Yoneda, both of Takefu (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/491,510

(22) Filed: Jan. 26, 2000

(30) Foreign Application Priority Data

Jan. 26, 1999 (JP) ................................................. 11-017451

(51) Int. Cl.⁷ ...................................................... H01G 4/005
(52) U.S. Cl. .................... 361/303; 361/306.3; 361/308.1; 361/321.2
(58) Field of Search ................................. 361/303, 306.1, 361/306.3, 308.1, 309, 321.2, 321.4, 321.5

(56) References Cited

FOREIGN PATENT DOCUMENTS 11-354374 * 12/1999 (JP) .

* cited by examiner

*Primary Examiner*—Anthony Dinkins
(74) *Attorney, Agent, or Firm*—Ostrolenk, Faber, Gerb & Soffen, LLP

(57) ABSTRACT

In a laminated ceramic electronic component such as a laminated ceramic capacitor, an improvement in the electric connection between an inner conductive layer and an outer conductor formed by baking with a conductive paste is achieved. The metal powder contained in the conductive paste which is used in order to form the outer conductor has a mean diameter is below double of thickness of the conductive inner layer.

7 Claims, 1 Drawing Sheet

LAMINATED CERAMIC ELECTRONIC COMPONENT

BACKGROUND OF THE INVENTION

This invention relates to a laminated ceramic electronic component. It is concerned with improving the electrical connection between an outer conductor and an inner conductive layer, especially that used in a laminated ceramic electronic component.

Laminated ceramic electronic components such as a laminated ceramic capacitor include a ceramic element. There is a conductive inner layer such as an internal electrode in this ceramic element. Edge parts of the conductive inner layer are exposed to the surface of the ceramic element and an outer conductor such as an external electrode on the surface of the ceramic element is electrically connected with the inner conductive layer.

A laminated ceramic electronic component having the above structure is obtained by baking a raw (green) ceramic laminated body in which the conductive inner layers are formed. In this baking process, the conductive inner layer is simultaneously baked together with the ceramic element.

The outer conductor of the laminated ceramic electronic component may be formed as follows: A conductive paste obtained usually by blending a metal powder and a glass powder with an organic vehicle is applied on a predetermined area of the ceramic element after baking. Then the conductive paste is baked.

In order to meet the demands of size-reduction and high-volume output, in the case for example of a laminated ceramic capacitor, the thickness of the internal electrode is also made thin, for example, about 1–5 micrometer. There are also cases where an internal electrode having a thickness of at most 3 micrometers is provided.

If the thickness of the internal electrode is made thin, as mentioned above, the exposed area of the internal electrode on the surface of the ceramic element also becomes small. When the particle diameter of the metal powder contained in the conductive paste used for the formation of an external electrode is large, comparatively many particles of the metal powder do not contact with the internal electrode. Thus, the electric connection condition between the external electrode and the internal electrode may become inadequate.

Moreover, an internal electrode baked with the ceramic element simultaneously may be in the condition that the edge parts thereof are positioned inside the surface of the ceramic element after baking. In this case, the above-mentioned inadequate electric connection condition will appear more notably.

Consequently, the objective of this invention is to offer a laminated ceramic electronic component which can solve the above-mentioned problem.

DESCRIPTION OF THE INVENTION

This invention is concerned with a laminated ceramic electronic component equipped with a ceramic element. An inner conductive layer is formed in the ceramic element so that an edge part thereof is exposed to the surface of the ceramic element, and the outer conductor is formed on the surface of the ceramic element so that it is connected with the edge part of the inner conductive layer electrically. The outer conductor is formed by baking the conductive paste containing a metal powder.

In order to solve the technical problem mentioned above in such a laminated ceramic electronic component, according to this invention, attention is directed to the relationship of the particle diameter of the metal powder contained in the conductive paste and the thickness of the inner conductive layer. At least a part of the metal powder contained in this conductive paste includes metal powder whose mean diameter is equal to or less than double of the thickness of the inner conductive layer.

The metal powder whose mean diameter is equal to or less than the double of the thickness of the inner conductive layer is about 1 weight % or more of the total amount of the metal powder contained in the conductive paste preferably.

Moreover, the metal powder whose mean diameter is equal to or less than double of the thickness of the inner-conductive layer in this invention may preferably be a metal powder whose mean diameter is equal to or less than the thickness of the metal powder of the conductive inner layer.

This invention is advantageously applied to a laminated ceramic component in which the thickness of the conductive inner layer is about 3 micrometers or less.

DESCRIPTION OF THE DRAWINGS

This invention is applicable not only to a laminated ceramic capacitor but also to other laminated ceramic electronic components such as a laminated ceramic varistor, a multilayer ceramic circuit board or a laminated ceramic filter as long as the outer conductor is formed by baking a conductive paste containing a metal powder. Embodiments of the present invention are explained below in relation to a laminated ceramic capacitor.

Figure 1:
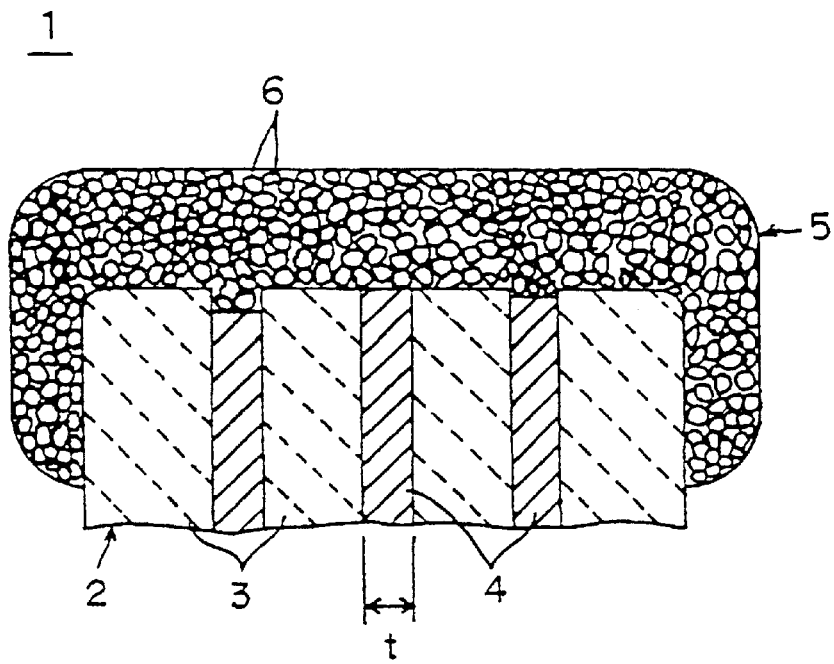
FIG. 1 is a sectional view showing part of a laminated ceramic capacitor 1 according to one embodiment of this invention.

FIG. 1 shows a part of a laminated ceramic capacitor 1 as one embodiment of this invention.

The laminated ceramic capacitor 1 is equipped with a ceramic element 2. The ceramic element 2 includes plurality of ceramic layers 3. An internal electrode 4 as an conductive inner layer is formed between each ceramic layer 3 in the lamination. The plurality of internal electrodes 4 are formed so that the edge parts thereof may be exposed on the surface of the ceramic element 2. Edge parts which are exposed to one end face of the ceramic element 2 as illustrated and edge parts which are exposed to another end face of the ceramic element 2 (not illustrated) are arranged alternately.

An external electrode 5 as an outer conductor is formed on a surface of the ceramic element 2. The external electrode 5 is formed more specifically on the end face of the ceramic element 2 at which the edge part of the internal electrode 4 is exposed. Thus, the external electrode 5 is connected with the corresponding internal electrodes 4 electrically.

In order to manufacture the above laminated ceramic capacitor 1, the ceramic element 2 is obtained by baking a raw ceramic laminated body with, or under conditions forming, the internal electrode 4 therein. In this baking process, the internal electrode 4 is simultaneously baked with the ceramic element 2.

The external electrode 5 is formed as follows: A conductive paste containing a metal powder, glass powder and an organic vehicle is applied to a predetermined area of the ceramic element 2 after baking, and the conductive paste is baked.

In this embodiment, the conductive paste used for the above-mentioned formation of the external electrode 5, as shown in FIG. 1, is characterised in containing a metal powder 6 whose mean diameter is equal to or less than thickness t of the internal electrode 4. As an example, when thickness t of the internal electrode 4 is 3 micrometers, a metal powder 6 whose mean diameter is 1 micrometer is used.

If the metal powder 6 whose mean diameter is equal to or less than thickness t of the internal electrode 4 is used, metal powder 6 and the internal electrode 4 can be made to contact reliably, as illustrated in FIG. 1. Moreover, even when the edge parts of the internal electrode 4 are positioned inside the ceramic element 2 as a result of baking, the metal powder may reach the edge parts of this internal electrode 4 since the metal powder 6 may pass through the gap and enter inside the ceramic element 2. So, also in this area, contact between the metal powder 6 and the internal electrode 4 is attained, and the electric connection between the internal electrode 4 and the external electrode 5 may be reliable.

Figure 2:
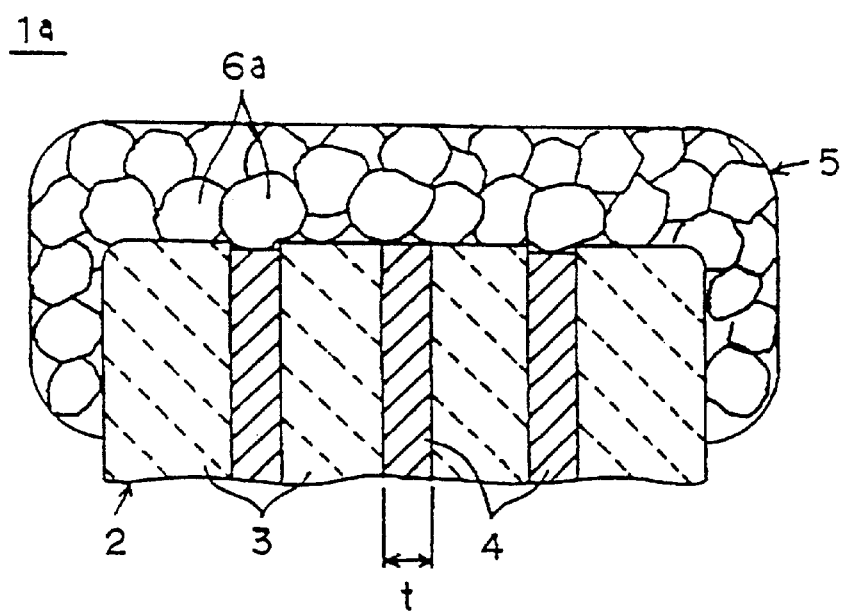
FIG. 2 is a sectional view showing part of a laminated ceramic-capacitor 1a according to another embodiment of this invention.

A part of laminated ceramic-capacitor 1 a according to another embodiment of this invention is shown in FIG. 2. In FIG. 2, similar reference symbols are given for the components equivalent to the components shown in FIG. 1, and repeated explanation is omitted.

The conductive paste used in this embodiment in order to form the external electrode 5 is characterised in containing metal-powder 6a whose mean diameter is equal to or less than double of the thickness t of the internal electrode 4. As an example, when thickness t of the internal electrode 4 is 3 micrometers, the metal powder 6 whose mean diameter is 5 micrometers is used.

In this embodiment, although the metal-powder 6a contained in the conductive paste has a mean diameter larger than thickness t of the internal electrode 4, because it is equal to or less than double of the thickness t, reliable contact condition between metal-powder 6a and the edge part of the internal electrode 4 is not obstructed, as shown in the example mentioned later. The reason is that even when the mean diameter of metal-powder 6a is larger than thickness t of the internal electrode 4, since each metal-powder particle 6a is not completely spherical and has roughness, as long as the mean diameter is equal to or less than the double of thickness t of the internal electrode 4, it can be made to contact even when the edge part of the internal electrode 4 is positioned inside the ceramic element 2, and certainly when it protrudes from ceramic element 2.

Each embodiment described above had a metal powder 6 whose mean diameter is equal to or less than thickness t of the internal electrode 4 or the mean diameter thereof is larger than thickness t of the internal electrode 4 but it included metal-powder 6a whose mean diameter is equal to or less than double of that value. However, a mixture of metal powders 6 and 6a can be used. Moreover, one may use a mixture of the metal powder 6 or 6a whose mean diameter is equal to or less than double of thickness t of the internal electrode 4 and a metal powder whose mean diameter exceeds the double of thickness t of the internal electrode 4. In this case, the metal powder 6 or 6a whose mean diameter is equal to or less than the double of thickness t of the internal electrode 4 desirably is about 1 weight % or more of the total amount of the metal powder contained in the conductive paste.

The desirable range for the mean diameter and the blend ratio of the metal powder which are included in the above-mentioned conductive paste are measured based on the following experiments.

In a laminated ceramic capacitor which has a ceramic element including barium titanate as the principal component of the dielectric material and has an internal electrode containing nickel with thickness of 3 micrometers after baking, a conductive paste containing 25 weight % of organic vehicle, 70 weight % of copper powder and 5 weight % of glass frit is used for the formation of the external electrode. The external electrode was formed by baking this conductive paste at a temperature of 800 degrees C in a nitrogen atmosphere. Furthermore, nickel plating and tin plating were sequentially applied on the external electrode.

Conductive pastes containing 5 kinds of copper powder, namely, copper powder whose mean diameters are 1 micrometer, 3 micrometers, 5 micrometers, 7 micrometers and 9 micrometers, were used as the conductive paste for the above-mentioned formation of the external electrode with a mix ratio as shown in the following Table 1.

TABLE 1

| Test Pieces | Mix Ratio of Copper Powder (weight %) | | | | | Ratio of Connection Defects |
|---|---|---|---|---|---|---|
| | 1 μm Powder | 3 μm Powder | 5 μm Powder | 7 μm Powder | 9 μm Powder | |
| 1 | 0 | 0 | 0 | 0 | 100 | 50/1000 |
| 2 | 0 | 0 | 0 | 100 | 0 | 5/1000 |
| 3 | 0 | 0 | 100 | 0 | 0 | 0/1000 |
| 4 | 0 | 100 | 0 | 0 | 0 | 0/1000 |
| 5 | 100 | 0 | 0 | 0 | 0 | 0/1000 |
| 6 | 0 | 0 | 0 | 1 | 99 | 20/1000 |
| 7 | 0 | 0 | 0.5 | 0 | 99.5 | 3/1000 |
| 8 | 0 | 0 | 1 | 0 | 99 | 0/1000 |

In Table 1, "ratio connection defects" shows the generation ratio of the connection defects by counting any item functioning at 90% or less of a predetermined electrostatic capacitance in the obtained laminated ceramic capacitor as one connection defects between the internal electrode and the external electrode.

In Table 1 specimens 3–5 where copper powder with mean diameters of 5 micrometers, 3 micrometers and 1 micrometers (which is equal to or less than double of the thickness of 3 micrometers of the internal electrode) are used, the generation of connection defects can be prevented. On the other hand, in specimens 1 and 2 using copper powder with a mean diameter exceeding double of the thickness of the internal electrode (9 micrometers and 7 micrometers), connection defects are produced with a comparatively high generation rate.

In specimen 6, the conductive paste contains 99 weight % of 9-micrometer copper powder and 1 weight % of 7-micrometer copper powder. Because both copper powders exceed double of the thickness of the internal electrode, connection defects are produced with a comparatively high generation rate. Specimens 7 and 8 contain not only copper powder whose mean diameter is 9 micrometers but also copper powder whose mean diameter is 5 micrometers which is equal to or less than the double of the thickness of an internal electrode, and "the ratio of connection defects" is low.

Specimen 7 includes only 0.5 weight % of the copper powder whose mean diameter is 5 micrometers which is equal to or less than double of the thickness of the internal electrode, while the test piece 8 includes 1 weight % of this 5-micrometer copper powder. In test piece 8, the connection defects can be prevented completely from generating. This shows that it is desirable to contain at least about 1 weight % of the copper powder whose mean diameter is equal to or less than the thickness of the internal electrode in the total amount of the copper powder in the conductive paste.

The above example used copper as the metal powder contained in the conductive paste. The same result is obtained using other metal powders.

According to this invention, since metal powder whose mean diameter is equal to or less than double of the thickness of the conductive inner layer is used in at least part of the metal powder contained in the conductive paste baked in order to form the outer conductor, the electric connection between the outer conductor and the inner conductor can be made reliable, and the electrical property and the reliability of the laminated ceramic electronic component can be improved.

Metal powder with mean diameter which is equal to or less than double of the thickness of the conductive inner layer is preferably contained in an amount of about 1 weight % of the total amount of the metal powder in the conductive paste in this invention. Using as the metal powder whose mean diameter is equal to or less than double of the thickness of the inner-conductive layer, or one whose mean diameter is actually equal to or less than the thickness of the conductive inner layer, the electric connection between the above-mentioned outer conductor and the mentioned above inner conductor will be secured more reliably. Moreover, this invention exhibits a remarkable effect, especially when the thickness of the inner-conductive layer is 3 micrometers or less.

What is claimed is:

1. A laminated ceramic electronic component comprising:
    at least two ceramic layers,
    an inner conductive layer disposed between two adjacent ceramic element layers so that an edge part thereof is exposed to the surface of the ceramic element layers,
    an outer conductor on the surface of the ceramic element layers connected with the edge part of the inner conductive layer electrically,
    wherein said outer conductor is a baked conductive paste containing a metal powder, and
    said metal powder contained in the conductive paste comprises metal powder having mean diameter which is equal to or less than double of the thickness of the inner conductive layer.

2. The laminated ceramic electronic component according to claim 1, wherein said metal powder having mean diameter which is equal to or less than double of the thickness of the inner conductive layer is at least about 1 weight % of the total amount of the metal powder contained in the conductive paste.

3. The laminated ceramic electronic component according to claim 2, wherein said metal powder having mean diameter which is equal to or less than double of the thickness of the inner conductive layer comprises metal powder whose mean diameter is equal to or less than the thickness of the conductive inner layer.

4. The laminated ceramic electronic component of claim 3, wherein the thickness of the inner conductive layer is 3 micrometers or less.

5. The laminated ceramic electronic component according to claim 1, wherein said metal powder having mean diameter which is equal to or less than double of the thickness of the inner conductive layer comprises metal powder whose mean diameter is equal to or less than the thickness of the inner conductive layer.

6. The laminated ceramic electronic component of claim 5, wherein the thickness of the inner conductive layer is 3 micrometers or less.

7. The laminated ceramic electronic component of claim 1, wherein the thickness of the inner conductive layer is 3 micrometers or less.

* * * * *